United States Patent

Smith

[11] Patent Number: 5,930,472
[45] Date of Patent: Jul. 27, 1999

[54] METHOD AND APPARATUS IN A WIRELESS COMMUNICATION SYSTEM FOR SPLITTING A BROWSER FUNCTIONALITY BETWEEN A WIRELESS CLIENT AND AN INFRASTRUCTURE PORTION

[75] Inventor: Dwight Randall Smith, Grapevine, Tex.

[73] Assignee: Motorola, Inc., Schaumburg, Ill.

[21] Appl. No.: 09/069,678

[22] Filed: Apr. 29, 1998

[51] Int. Cl.$^6$ .............................. G06F 17/00; G06F 13/00; G06F 17/30; G06F 5/01
[52] U.S. Cl. .............................. 395/200.33; 395/200.49; 395/200.76; 713/200; 713/201
[58] Field of Search ..................... 395/188.01, 187.01, 395/186, 200.33, 200.47, 200.48, 200.49, 200.59, 200.76, 200.64, 200.65; 711/118, 164; 707/104, 516; 370/381

[56] References Cited

U.S. PATENT DOCUMENTS

| | | | |
|---|---|---|---|
| 5,287,487 | 2/1994 | Priem et al. | 395/425 |
| 5,305,389 | 4/1994 | Palmer | 381/1 |
| 5,442,633 | 8/1995 | Perkins et al. | 370/94.1 |
| 5,572,643 | 11/1996 | Judson | 395/793 |
| 5,673,322 | 9/1997 | Pepe et al. | 380/49 |
| 5,701,451 | 12/1997 | Rogers et al. | 395/600 |
| 5,737,536 | 4/1998 | Herrmann et al. | 395/200.59 |
| 5,737,560 | 4/1998 | Yohanan | 395/349 |
| 5,737,619 | 4/1998 | Judson | 395/761 |
| 5,748,892 | 5/1998 | Richardson | 395/200.3 |
| 5,757,159 | 5/1998 | Kikinis | 395/200.76 |
| 5,764,889 | 6/1998 | Ault et al. | 395/186 |
| 5,774,660 | 6/1998 | Brendel et al. | 395/200.31 |
| 5,787,254 | 7/1998 | Maddalozzo, Jr. et al. | 395/200.58 |
| 5,802,292 | 9/1998 | Mogul | 395/200.33 |
| 5,852,717 | 12/1998 | Bhide et al. | 395/200.33 |
| 5,857,201 | 1/1999 | Wright, Jr. et al. | 707/104 |
| 5,862,348 | 1/1999 | Pedersen | 395/200.59 |
| 5,864,676 | 1/1999 | Beer et al. | 395/200.59 |
| 5,864,852 | 1/1999 | Luotonen | 707/10 |
| 5,864,854 | 1/1999 | Boyle | 707/10 |

OTHER PUBLICATIONS

Kiuchi et al., "C—HTTP—The Development of a Secure, Closed HTTP—Based Network on the Internet", IEEE, pp. 54–75, 1996.

Goddard et al., "Web Vector: Agents with URLs", IEEE, pp. 100–105, 1997.

Kindlund, "Navigating the Applet–Browser Divide", IEEE, pp. 22–25, 1997.

Puliafito et al., "Increasing Application Accessibility through Java", pp. 70–77, 1998.

Primary Examiner—Robert W. Beausoliel, Jr.
Assistant Examiner—Andy Nguyen
Attorney, Agent, or Firm—R. Louis Breeden

[57] ABSTRACT

A browser functionality is split between a wireless client (122) and an infrastructure portion (102) of a wireless communication system. The infrastructure portion sends (412) to the wireless client a response from a server (124) to an earlier request originated (404) by the wireless client, the response modified by the infrastructure portion to comprise a placeholder for an additional data element needed to complete the response. Without a need for a further request from the wireless client, the infrastructure portion then originates (414) a request to the server for the additional data element and forwards (418) the additional data element to the wireless client when received from the server.

21 Claims, 5 Drawing Sheets

METHOD AND APPARATUS IN A WIRELESS COMMUNICATION SYSTEM FOR SPLITTING A BROWSER FUNCTIONALITY BETWEEN A WIRELESS CLIENT AND AN INFRASTRUCTURE PORTION

FIELD OF THE INVENTION

This invention relates in general to wireless communication systems, and more specifically to a method and apparatus in a wireless communication system for splitting a browser functionality between a wireless client and an infrastructure portion of the system.

BACKGROUND OF THE INVENTION

Traditional browser activities have involved client requests for data from various servers via a network such as the Internet. Specifically the expectation has been that HyperText Markup Language (HTML) formatted information will be acquired using HyperText Transfer Protocol (HTTP). Examination of retrieved data can result in additional requests to the same or different servers.

Such activities, when performed by a wireless client, will involve multiple end-to-end transactions that generally have high latency. The result is a high turn-around time for transactions, producing annoyingly slow response time.

Thus, what is needed is a method and apparatus for removing latency from the multiple transactions needed to acquire data by a wireless client. Ideally, the method and apparatus will bring the response time of wireless data acquisition close to that of data acquisition in a wired system.

SUMMARY OF THE INVENTION

An aspect of the present invention is a method in a wireless communication system for splitting a browser functionality between a wireless client and an infrastructure portion of the wireless communication system. The method comprises the step of sending, to the wireless client by the infrastructure portion, a response from a server to an earlier request originated by the wireless client, the response modified by the infrastructure portion to comprise a placeholder for an additional data element needed to complete the response. The method further comprises the steps of originating, by the infrastructure portion without a need for a further request from the wireless client, a request to the server for the additional data element; and forwarding, by the infrastructure portion, the additional data element to the wireless client when received from the server.

Another aspect of the present invention is a controller in a wireless communication system for splitting a browser functionality between a wireless client and the controller. The controller comprises a network interface for communicating with a server, and a processing system coupled to the network interface for processing communications with the server. The controller further comprises a base station interface coupled to the processing system for controlling a base station. The processing system is programmed to send to the wireless client a response from the server to an earlier request originated by the wireless client, the response modified to comprise a placeholder for an additional data element needed to complete the response. The processing system is further programmed to originate, without a need for a further request from the wireless client, a request to the server for the additional data element; and to forward the additional data element to the wireless client when received from the server.

Another aspect of the present invention is a portable subscriber unit in a wireless communication system for splitting a browser functionality between the portable subscriber unit and an infrastructure portion of the wireless communication system. The portable subscriber unit comprises a transceiver for communicating with the infrastructure portion, and a processing system coupled to the transceiver for controlling the transceiver. The portable subscriber unit further comprises a user interface coupled to the processing system for interfacing with a user. The processing system is programmed to receive, through the infrastructure portion, a response from a server to an earlier request originated by the portable subscriber unit, the response modified by the infrastructure portion to comprise a placeholder for an additional data element needed to complete the response. The processing system is further programmed to rely upon the infrastructure portion to originate, without a need for a further request from the portable subscriber unit, a request to the server for the additional data element; and to accept from the infrastructure portion the additional data element when received from the server.

DETAILED DESCRIPTION OF THE DRAWINGS

Figure 1:
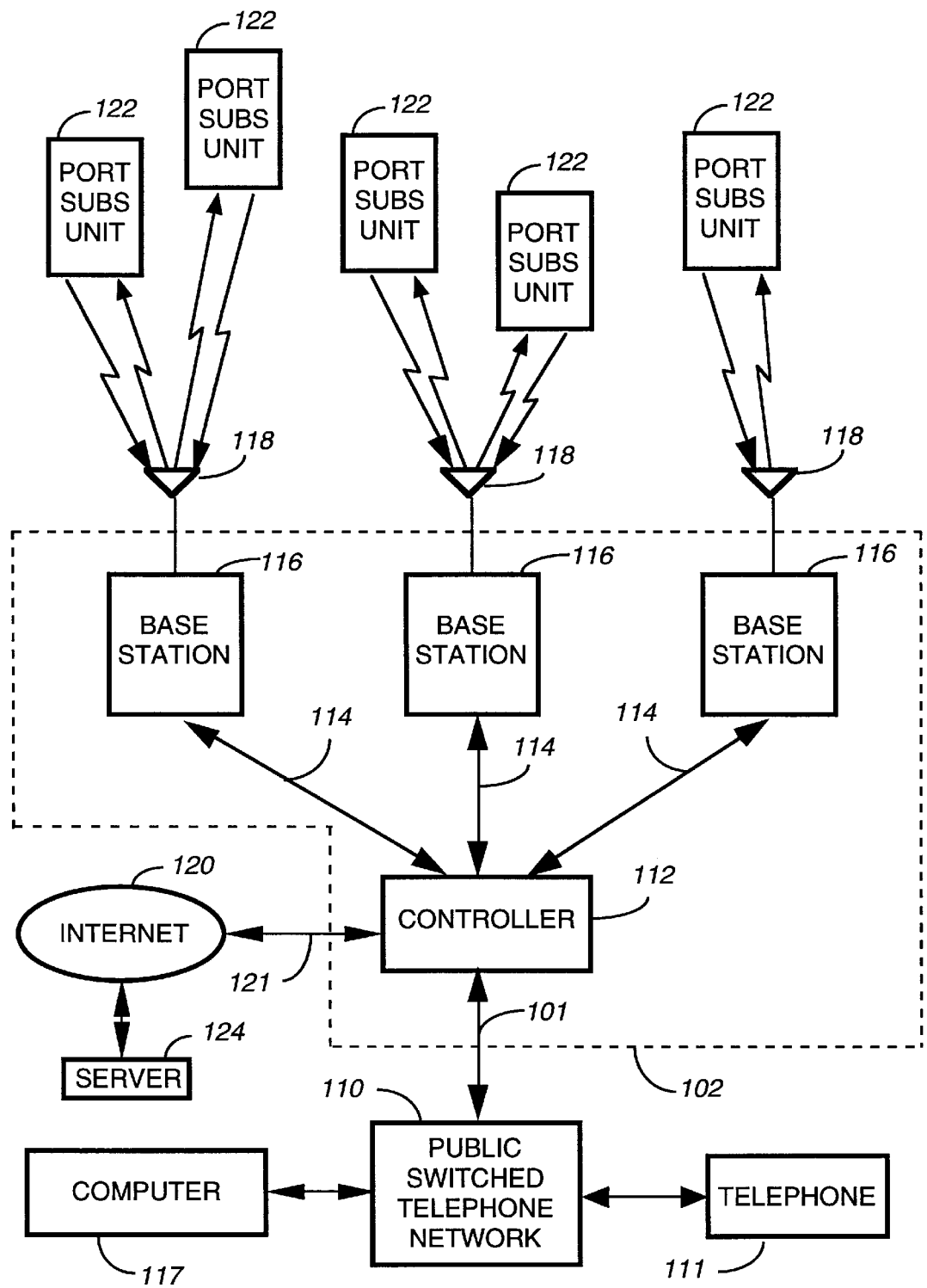
FIG. 1 is an electrical block diagram of an exemplary wireless communication system in accordance with the present invention.

Referring to FIG. 1, an electrical block diagram depicts an exemplary wireless communication system in accordance with the present invention comprising an infrastructure portion 102 including a controller 112 and a plurality of conventional base stations 116, the communication system also including a plurality of portable subscriber units 122 (also referred to herein as "wireless clients"). The base stations 116 preferably communicate with the portable subscriber units 122 utilizing conventional radio frequency (RF) techniques, and are coupled by conventional communication links 114 to the controller 112, which controls the base stations 116.

The hardware of the controller 112 is preferably a combination of the Wireless Messaging Gateway (WMG™) Administrator! paging terminal, and the RF-Conductor!™ message distributor manufactured by Motorola, Inc. The software of the controller 112 is modified in accordance with the present invention. The hardware of the base stations 116 is preferably a combination of the RF-Orchestra! transmitter and RF-Audience!™ receivers manufactured by Motorola, Inc. The portable subscriber units 122 are preferably similar to PageWriter™ 2000 data messaging units, also manufactured by Motorola, Inc., and having software modified in accordance with the present invention. It will be appreciated that other similar hardware can be utilized as well for the controller 112, the base stations 116, and the portable subscriber units 122.

Each of the base stations 116 transmits RF signals to the portable subscriber units 122 via an antenna 118. The base stations 116 preferably each receive RF signals from the plurality of portable subscriber units 122 via the antenna 118. The RF signals transmitted by the base stations 116 to the portable subscriber units 122 (outbound messages) comprise selective call addresses identifying the portable subscriber units 122, and data messages originated by a caller, as well as commands originated by the controller 112 for adjusting operating parameters of the radio communication system. The RF signals preferably transmitted by the portable subscriber units 122 to the base stations 116 (inbound messages) comprise responses that include scheduled messages, such as positive acknowledgments (ACKs) and negative acknowledgments (NAKs), and unscheduled messages, such as registration requests.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. In addition, the controller 112 preferably is coupled through a conventional communication link 121 to the Internet 120 for acquiring data, e.g., web pages, from at least one server 124 also coupled to the Internet.

The over-the-air protocol utilized for outbound and inbound messages is preferably selected from Motorola[<b]old3 s well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well.

Figure 2:
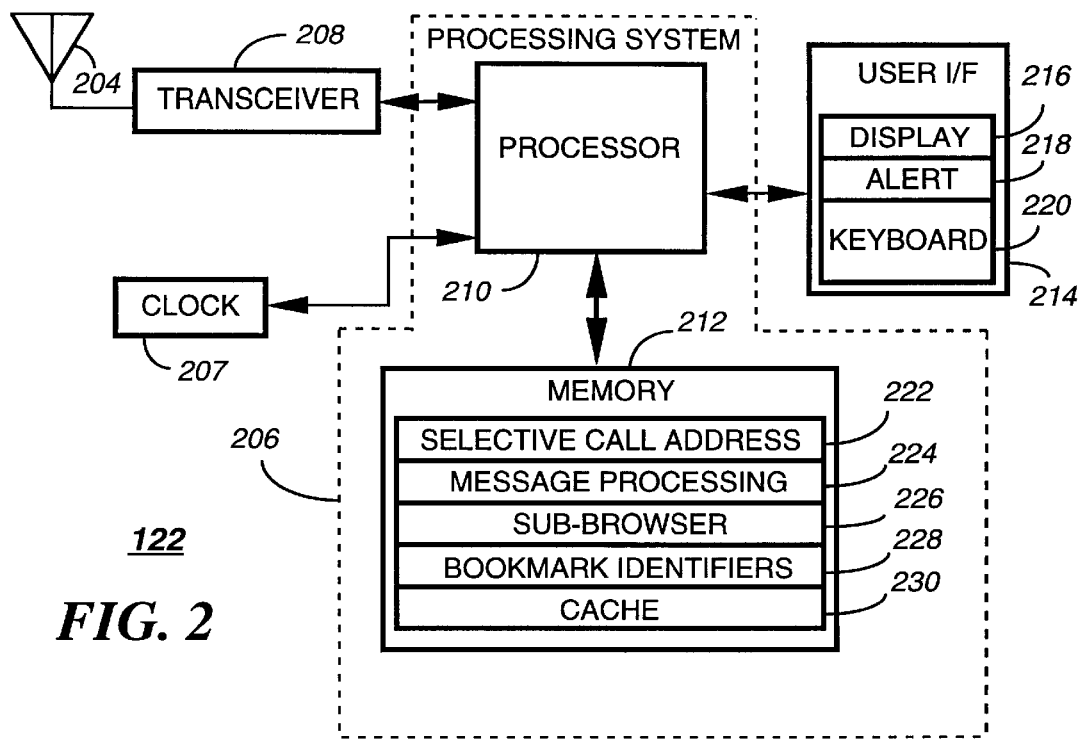
FIG. 2 is an electrical block diagram of an exemplary portable subscriber unit in accordance with the present invention.

FIG. 2 is an electrical block diagram of an exemplary portable subscriber unit 122 (also known as a "wireless client") in accordance with the present invention. The portable subscriber unit 122 comprises an antenna 204 for intercepting an outbound message and for transmitting an inbound message. The antenna 204 is coupled to a conventional transceiver 208 for receiving the outbound message and for transmitting the inbound message. The transceiver 208 is coupled to a processing system 206 for processing the outbound and inbound messages and for controlling the portable subscriber unit 122 in accordance with the present invention. A user interface 214 preferably is also coupled to the processing system 206 for interfacing with a user. The user interface 214 comprises a conventional display 216 for displaying the inbound and outbound messages, a conventional alert element 218 for alerting the user when the outbound message arrives, and a conventional keyboard 220 for generating the inbound message and for controlling the portable subscriber unit 122. A conventional clock 207 is also coupled to the processing system 206 for supporting time keeping requirements of the portable subscriber unit 122.

The processing system 206 comprises a conventional processor 210 and a conventional memory 212. The memory 212 comprises software elements and other variables for programming the processing system 206 in accordance with the present invention. The memory 212 preferably includes a selective call address 222 to which the portable subscriber unit 122 is responsive. In addition, the memory 212 includes a message processing element 224 for programming the processing system 206 to process messages through well-known techniques. The memory 212 further comprises a sub-browser 226 for handling activities such as requests for information from the Internet, and the organization and display of the information when received. To reduce latency, the data acquisition functionality and selected other functionalities normally resident in a traditional browser have been split between the sub-browser 226 and the controller 112 in accordance with the present invention, as is described further below. The memory 212 also includes space for bookmark identifiers 228 and a cache 230 for storing previously received data, such as image data.

Figure 3:
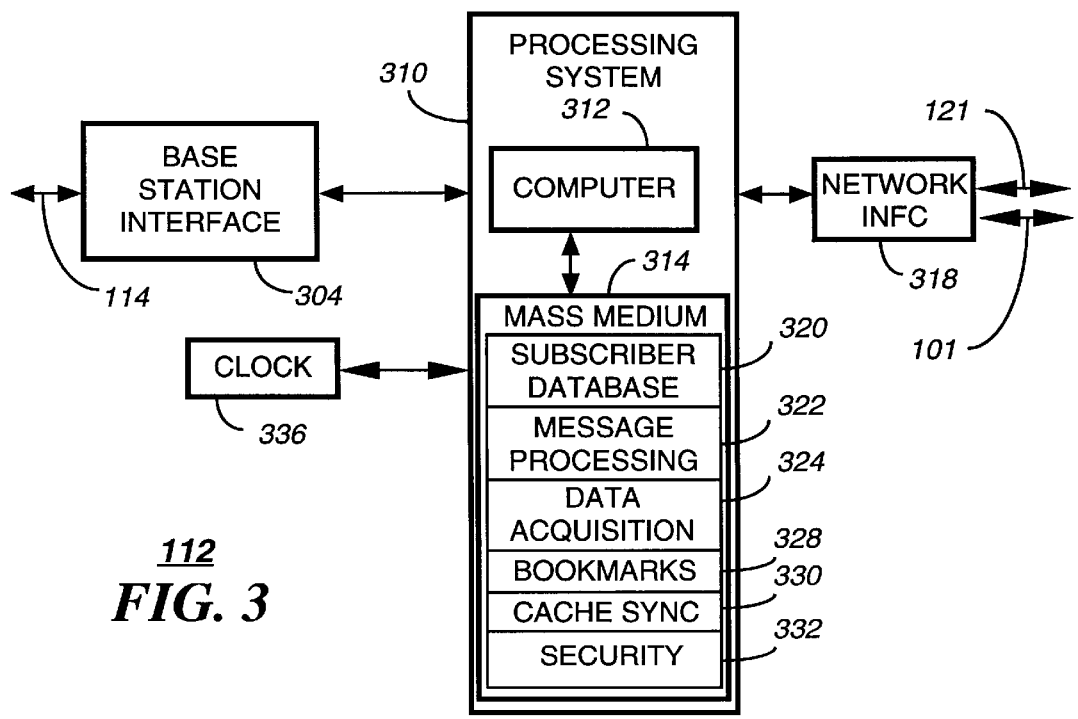
FIG. 3 is an electrical block diagram of an exemplary controller in accordance with the present invention.

FIG. 3 is an electrical block diagram depicting an exemplary controller 112 in accordance with the present invention. The controller 112 comprises a network interface 318 for receiving a message from a message originator via the telephone links 101. The network interface 318 also preferably communicates with the at least one server 124 via the communication link 121 to the Internet 120. It will be appreciated that, alternatively, more than one network interface 318 can be utilized, and that different network interfaces 318 can be utilized for receiving the message and for communicating with the at least one server 124.

The network interface 318 is coupled to a processing system 310 for controlling and communicating with the network interface 318. The processing system is coupled to a base station interface 304 for controlling and communicating with the base stations 116 via the communication links 114. The processing system 310 is also coupled to a conventional clock 336 for providing a timing signal to the processing system 310. The processing system 310 comprises a conventional computer 312 and a conventional mass medium 314, e.g., a magnetic disk drive, programmed with information and operating software in accordance with the present invention. The mass medium 314 comprises a conventional subscriber database 320 for storing profiles defining service for subscribers using the system. The mass medium 314 further comprises a message processing element 322 for processing messages through well-known techniques.

The mass medium 314 also includes a data acquisition element 324 for programming the processing system to acquire needed data elements from the server 124 on behalf of the portable subscriber unit 122, in accordance with the present invention. The mass medium 314 further comprises a bookmarks area 328 for storing bookmarked universal resource locators (URLs) and corresponding identifiers for wireless clients. In addition, the mass medium 314 includes a cache synchronization element 330 for programming the processing system 310 to maintain synchronization with information cached in the wireless clients, in accordance with a set of predetermined rules. Preferably, the portable subscriber unit 122 and the controller 112 periodically communicate cache control information with one another to achieve and maintain cache synchronization through well-known techniques. The mass medium 314 also includes a security area 332 for storing "cookies" (e.g., information identifying a visited site and recording selected actions taken during the visit) and security certificates, such as encryption keys, on behalf of the wireless clients. In addition, the security area 332 preferably stores user name and password information for domains visited by the wireless clients.

Figure 4:
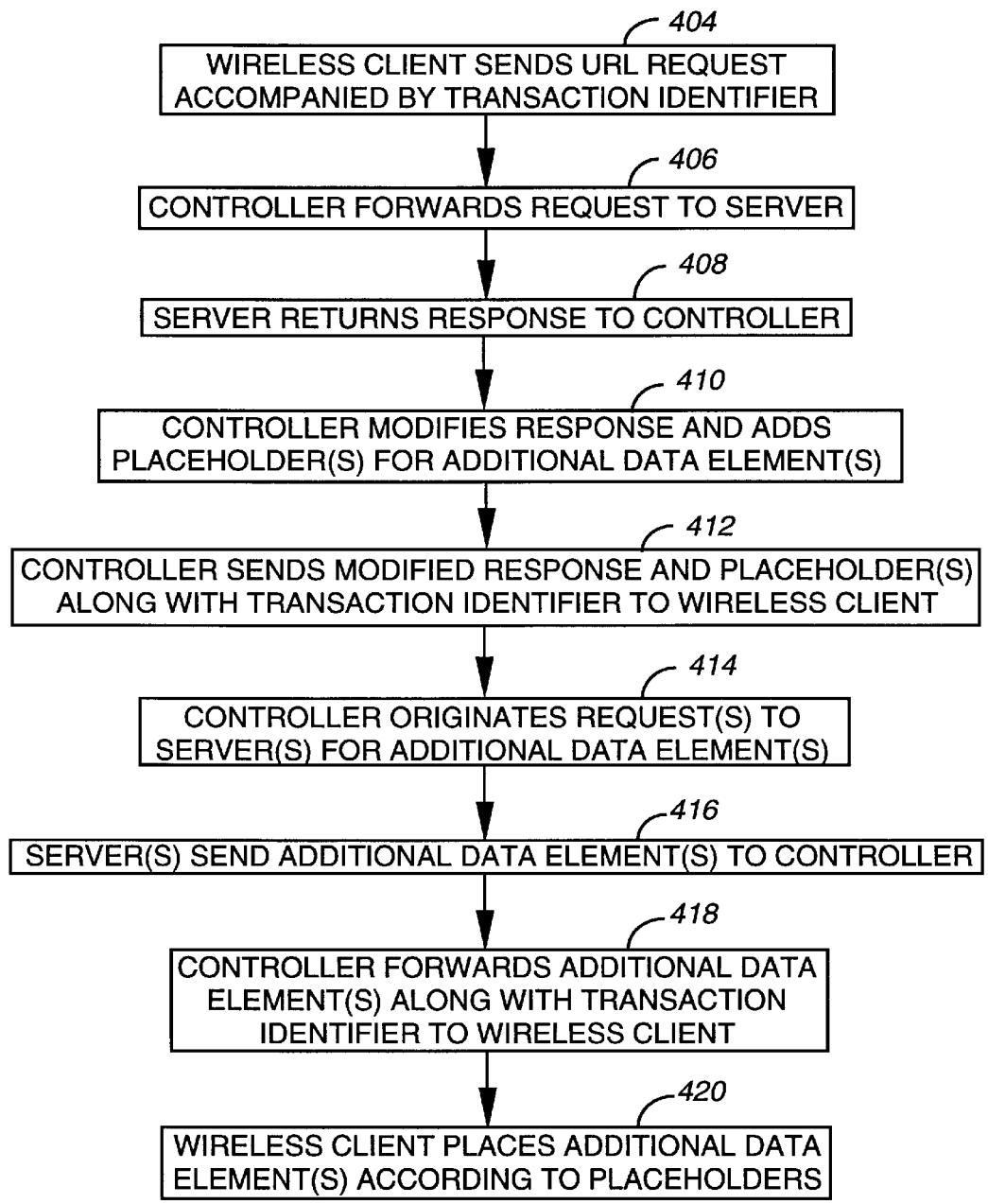
FIGS. 4–8 are flow diagrams depicting operation of the exemplary wireless communication system in accordance with the present invention.

Referring to FIG. 4, a flow diagram 400 depicts a data acquisition operation of the exemplary wireless communication system in accordance with the present invention. First, one of the portable subscriber units 122 (i.e., one of the wireless clients) sends 404 a URL request accompanied by a transaction identifier:
For example,
Request from client—GET http://www.quote.com/?stock=MOT REQID=89 FC.

The controller 112 forwards 406 the request to the server 124, and the server 124 returns 408 a response to the controller 112, through well-known techniques. The controller modifies 410 the response and adds one or more placeholders for one or more additional data elements that will be required for completion. A placeholder is preferably an efficiently transmitted marker for designating where the additional data element(s) are to be placed relative to other data in the response. The controller then sends 412 the modified response and placeholder(s), along with the transaction identifier to the wireless client:
For example,
Initial response from controller DATA 89FC:00 LEN=234 HOLDERS=3
<<<data with placeholder(s)>>>.

Next, the controller 112 originates 414 at least one request to the at least one server 124 for the additional data element(s). (It will be appreciated that several different servers 124 may sometimes need to be accessed.) In response, the at least one server 124 sends 416 the additional data element(s) to the controller 112. The controller 112 then forwards 418 the additional data element(s), along with the transaction identifier to the wireless client:
For example,

| Placeholder data #1 - | DATA 89FC:01 LEN=3244 |
| | <<<data>>> |
| Placeholder data #2 - | DATA 89FC:02 LEN=980 |
| | <<<data>>> |
| Placeholder data #3 - | DATA 89FC:03 LEN=2196 |
| | <<<data>>>. |

(The HTML control items, e.g., DATA, LEN=, HOLDERS=, preferably are tokenized for efficient over-the-air transmission.)

In response, the wireless client places 420 the additional data element(s) according to the placeholder(s) to complete the data acquisition. The technique described above advantageously removes latency from the multiple transactions that can be needed to acquire data by a wireless client. Only a single request is required by the wireless client to acquire the data corresponding to the requested URL. By moving the data acquisition functionality into the controller 112 whenever possible, the present invention advantageously reduces the response time of wireless acquisition to near that of a wired system.

Figure 5:
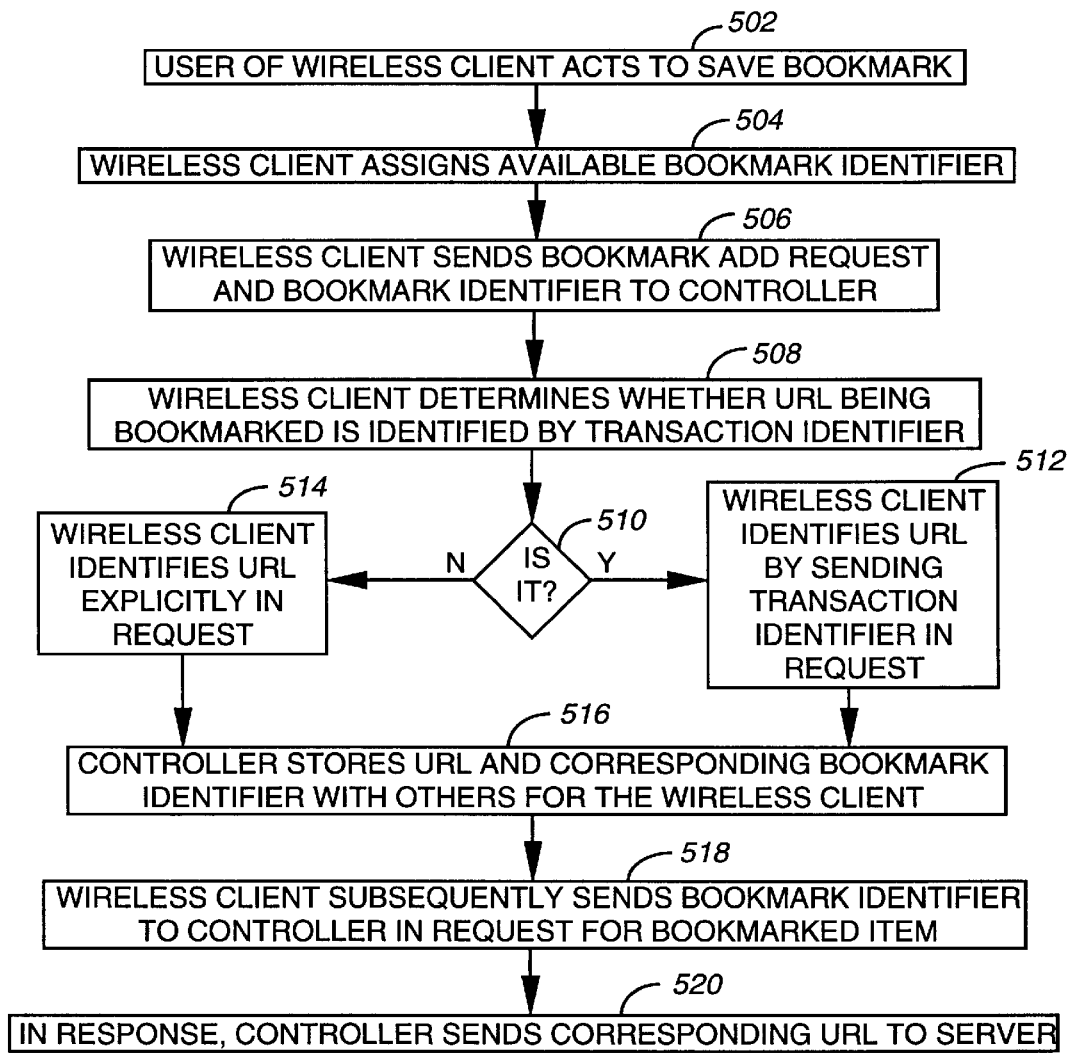

Referring to FIG. 5, a flow diagram 500 depicts a bookmarking operation of the exemplary wireless communication system in accordance with the present invention. The flow begins with the user of the wireless client acting 502 to save a bookmark. This can be accomplished, for example, through a predetermined key sequence on the keyboard 220. In response, the processing system 206 of the wireless client assigns 504 an available bookmark identifier. The processing system 206 then sends 506 a bookmark add request and bookmark identifier to the controller. In sending the bookmark add request, the processing system determines 508, 510 whether the URL being bookmarked is identified by the transaction identifier, as in step 404 of the flow diagram 400. If so, the processing system 206 identifies the URL by sending 512 the transaction identifier in the bookmark add request:
For example,
Request by client—BKADD BKID=24 BKREQ=89 FC
Response by agent—BKADD NEW
(set to 'http://www.quote.com/?stock=MOT').

On the other hand, if in steps 508, 510 the processing system determines that the URL is not identified by a transaction identifier, then the processing system 206 identifies the URL explicitly in the bookmark add request:
For example,
Request by client—BKADD BKID=24
BKURL='http:/ /www.mot.com/curnews'
Response by agent—BKADD CHG Regardless how the URL is identified, the processing system 310 of the controller 112 stores 516 the URL and the corresponding bookmark identifier with other bookmarks and identifiers for the wireless client, so that in the future the wireless client will be able to access the URL by sending 518 only the bookmark identifier. In response, the controller 112 sends 520 the corresponding URL to the server 124 on behalf of the wireless client. The technique depicted in the flow diagram 500 advantageously reduces inbound traffic and latency by minimizing the amount of inbound data for requesting frequently accessed URLs. This is because the bookmark identifiers preferably are much shorter, e.g., two characters, than an explicit URL, which can be twenty characters or longer.

Figure 6:
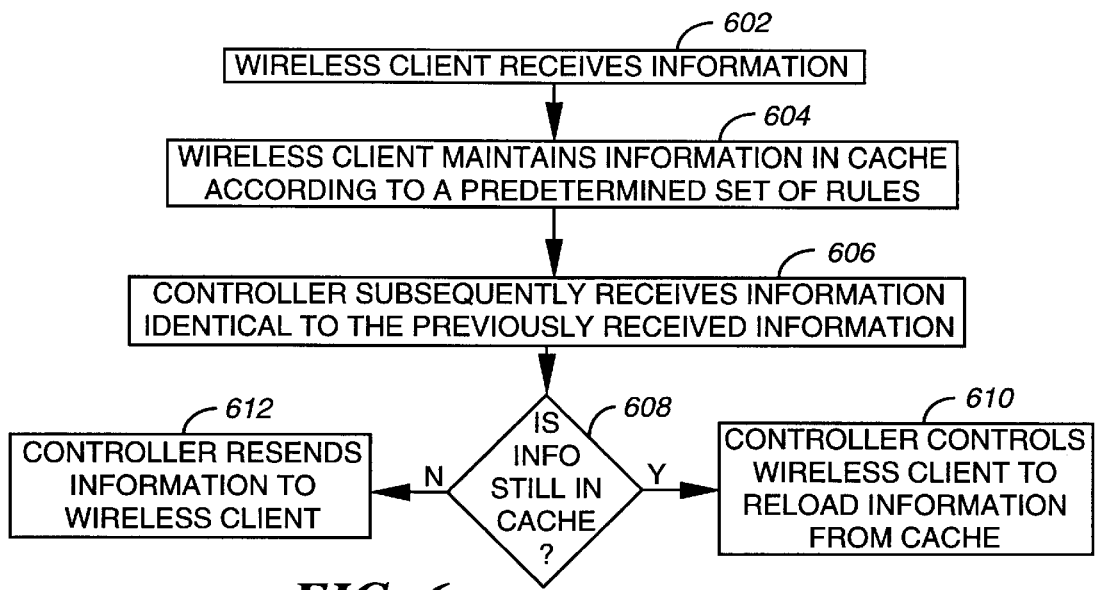

Referring to FIG. 6, a flow diagram 600 depicts a caching operation of the exemplary wireless communication system in accordance with the present invention. The flow begins with the wireless client receiving 602 information forwarded through the controller 112. In response, the wireless client maintains 604 the information in the cache 230 according to a predetermined set of rules, e.g., deletion rules affected by the age of the information and the amount of free cache memory available. Subsequently, the controller 112 receives 606 new information for the wireless client that is identical to the previously received and forwarded information. The controller 112, for example, can detect identical information by maintaining a record of headers identifying data sent to the wireless client. The controller 112 determines 608, from the predetermined set of rules, whether the information is still in the cache 230. If so, the controller 112 controls 610 the wireless client to reload the information from the cache 230, thereby advantageously eliminating the need for retransmitting the information over the wireless link. On the other hand, if the predetermined set of rules indicate in step 608 that the information has been deleted from the cache 230, then the controller resends 612 the information to the wireless client. It will be appreciated that to maintain cache synchronization, the controller 112 and the wireless client can periodically communicate cache control information through well-known techniques.

Figure 7:
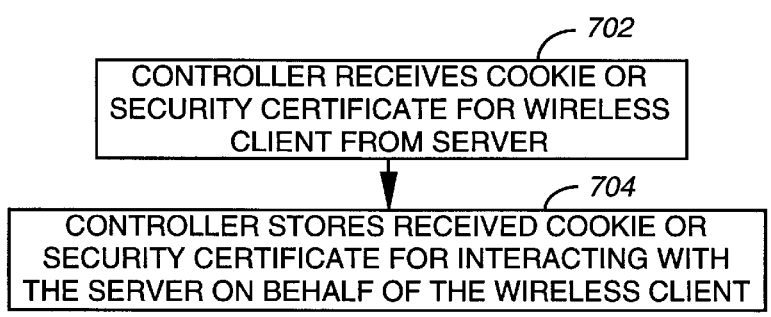

Referring to FIG. 7, a flow diagram 700 depicts a security operation of the exemplary wireless communication system in accordance with the present invention. The flow begins with the controller 112 receiving 702 a cookie or security certificate for the wireless client. In response, the controller 112 stores 704 the received cookie or security certificate for interacting with the server 124 on behalf of the wireless client. This technique advantageously eliminates the wireless traffic that would result if the wireless client itself handled cookies and security certificates in a traditional manner.

Figure 8:
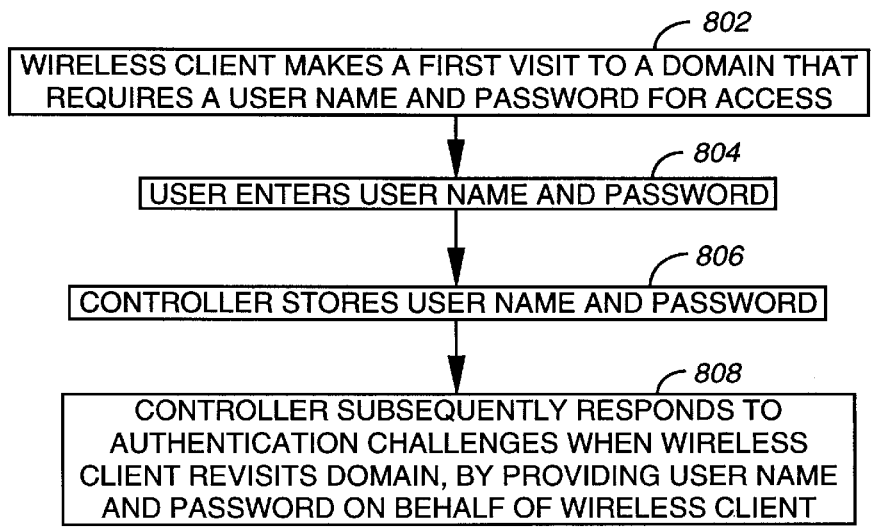

Referring to FIG. 8, a flow diagram 800 depicts an authentication operation of the exemplary wireless communication system in accordance with the present invention. The flow begins with the wireless client making 802 a first visit to a domain that requires a user name and password for access. In response, the user obtains and enters 804 a user name and password. The controller 112 stores 806 the user name and password for the wireless client in the mass medium 314 for future reference. Preferably, the user name and password are stored in a coded field which has been encrypted for security. When the wireless client subsequently revisits the domain, the controller 112 responds 808 to authentication challenges by providing the user name and password on behalf of the wireless client, advantageously eliminating authentication traffic over the wireless link.

Thus, it should be clear from the preceding disclosure that the present invention provides a method and apparatus for removing latency from the multiple transactions needed to acquire data by a wireless client. Advantageously, the method and apparatus brings the response time of wireless data acquisition close to that of data acquisition in a wired system. Many modifications and variations of the present invention are possible in light of the above teachings. For example, although the browser functionality has been depicted, by way of example, as split between the wireless client and the controller 112 of the wireless communication system, the browser functionality can, alternatively, be split between the wireless client and the base stations 116, or between the wireless client and an additional intermediate controller (not shown), or between the wireless client and a plurality of infrastructure entities. Practicing the present invention via the base stations 116 or via an intermediate controller, or via other infrastructure entities also removes browser traffic from the wireless links, so that latency and turn-around time are advantageously minimized. Thus, it is to be understood that, within the scope of the appended claims, the invention can be practiced other than as described herein above.

What is claimed is:

1. A method in a wireless communication system for splitting a browser functionality between a wireless client and an infrastructure portion of the wireless communication system, the method comprising the steps of:

sending, to the wireless client by the infrastructure portion, a response from a server to an earlier request originated by the wireless client, the response modified by the infrastructure portion to comprise a placeholder for an additional data element needed to complete the response;

originating, by the infrastructure portion without a need for a further request from the wireless client, a request to the server for the additional data element; and forwarding, by the infrastructure portion, the additional data element to the wireless client when received from the server.

2. The method of claim 1, further comprising the steps of:

storing, in the infrastructure portion, uniform resource locators (URLs) and corresponding bookmark identifiers; and sending, to the server by the infrastructure portion, one of the URLs in response to receiving from the wireless client a corresponding one of the bookmark identifiers.

3. The method of claim 1, further comprising the steps of:

maintaining, in the wireless client, a cache of previously received information held according to a set of predetermined rules; and controlling the wireless client, by the infrastructure portion, to reload the previously received information from the cache when the infrastructure portion has received new information identical to the previously received information and determines from the set of predetermined rules that the wireless client still has the previously received information in the cache.

4. The method of claim 1, further comprising the step of communicating cache control information between the wireless client and the infrastructure portion to achieve cache synchronization.

5. The method of claim 1, further comprising the steps of:

sending, by the wireless client, a request accompanied by a transaction identifier; and returning , by the infrastructure portion, the transaction identifier with a response and placeholder data associated with the request.

6. The method of claim 1, further comprising the step of holding, by the infrastructure portion, cookies and security certificates on behalf of the wireless client.

7. The method of claim 1, further comprising the steps of:

holding, by the infrastructure portion, user name and password information for a domain visited by the wireless client; and responding, by the infrastructure portion, to authentication challenges when the wireless client revisits the domain, by providing the user name and password information on behalf of the wireless client.

8. A controller in a wireless communication system for splitting a browser functionality between a wireless client and the controller, comprising:

a network interface for communicating with a server;

a processing system coupled to the network interface for processing communications with the server;

a base station interface coupled to the processing system for controlling a base station, wherein the processing system is programmed to:

send to the wireless client a response from the server to an earlier request originated by the wireless client, the response modified to comprise a placeholder for an additional data element needed to complete the response;

originate, without a need for a further request from the wireless client, a request to the server for the additional data element; and forward the additional data element to the wireless client when received from the server.

9. The controller of claim 8, wherein the processing system is further programmed to:

store, in the controller, uniform resource locators (URLs) and corresponding bookmark identifiers; and send, to the server, one of the URLs in response to receiving from the wireless client a corresponding one of the bookmark identifiers.

10. The controller of claim 8, wherein the wireless client maintains a cache of previously received information held according to a set of predetermined rules; and wherein the processing system is further programmed to control the wireless client to reload the previously received information from the cache when the processing system has received new information identical to the previously received information and determines from the set of predetermined rules that the wireless client still has the previously received information in the cache.

11. The controller of claim 8, wherein the processing system is further programmed to communicate cache control information between the wireless client and the controller to achieve cache synchronization.

12. The controller of claim 8, wherein the wireless client is arranged to send a request accompanied by a transaction identifier, and wherein the processing system is further programmed to return the transaction identifier with a response and placeholder data associated with the request.

13. The controller of claim 8, wherein the processing system is further programmed to hold cookies and security certificates on behalf of the wireless client.

14. The controller of claim 8, wherein the processing system is further programmed to:

hold user name and password information for a domain visited by the wireless client; and respond to authentication challenges when the wireless client revisits the domain, by providing the user name and password information on behalf of the wireless client.

15. A portable subscriber unit in a wireless communication system for splitting a browser functionality between the portable subscriber unit and an infrastructure portion of the wireless communication system, the portable subscriber unit comprising:

a transceiver for communicating with the infrastructure portion;

a processing system coupled to the transceiver for controlling the transceiver; and a user interface coupled to the processing system for interfacing with a user, wherein the processing system is programmed to:

receive, through the infrastructure portion, a response from a server to an earlier request originated by the portable subscriber unit, the response modified by the infrastructure portion to comprise a placeholder for an additional data element needed to complete the response;

rely upon the infrastructure portion to originate, without a need for a further request from the portable subscriber unit, a request to the server for the additional data element; and accept from the infrastructure portion the additional data element when received from the server.

16. The portable subscriber unit of claim 15, wherein the processing system is further programmed to:

send to the infrastructure portion a bookmark identifier corresponding to a uniform resource locator (URL) stored in the infrastructure portion; and rely upon the infrastructure portion to send to the server the corresponding URL in response to receiving the bookmark identifier.

17. The portable subscriber unit of claim 15, wherein the processing system is further programmed to:

maintain a cache of previously received information held according to a set of predetermined rules; and be controlled by the infrastructure portion to reload the previously received information from the cache when the infrastructure portion has received new information identical to the previously received information and determines from the set of predetermined rules that the portable subscriber unit still has the previously received information in the cache.

18. The portable subscriber unit of claim 15, wherein the processing system is further programmed to communicate cache control information between the portable subscriber unit and the infrastructure portion to achieve cache synchronization.

19. The portable subscriber unit of claim 15, wherein the processing system is further programmed to:

sending a request accompanied by a transaction identifier; and receive the transaction identifier from the infrastructure portion with a response and placeholder data associated with the request.

20. The portable subscriber unit of claim 15, wherein the processing system is further programmed to rely upon the infrastructure portion to hold cookies and security certificates on behalf of the portable subscriber unit.

21. The portable subscriber unit of claim 15, wherein the processing system is further programmed to rely upon the infrastructure portion to:

hold user name and password information for a domain visited by the portable subscriber unit; and respond to authentication challenges when the portable subscriber unit revisits the domain by providing the user name and password information on behalf of the portable subscriber unit.

\* \* \* \* \*